(12) United States Patent
Bussières et al.

(10) Patent No.: US 7,214,035 B2
(45) Date of Patent: May 8, 2007

(54) ROTOR FOR A TURBOMACHINE

(75) Inventors: Mario Bussières, 510, 7th Avenue, P.O. Box 1292, Malartic, Quebec (CA) J0Y 1Z0; Normand Bussiéres, Rivière-Hèva (CA)

(73) Assignee: Mario Bussières, Malartic, Quebec (CA)

( * ) Notice: Subject to any disclaimer, the term of this patent is extended or adjusted under 35 U.S.C. 154(b) by 105 days.

(21) Appl. No.: 11/060,416

(22) Filed: Feb. 18, 2005

(65) Prior Publication Data

US 2006/0188375 A1 Aug. 24, 2006

(51) Int. Cl.
*F01D 5/30* (2006.01)

(52) U.S. Cl. .................... 416/207; 416/220 R

(58) Field of Classification Search ............ 416/207 R, 416/207, 219 R, 220 A, 220 R, 136, 93 A
See application file for complete search history.

(56) References Cited

U.S. PATENT DOCUMENTS

| 408,397 | A | * | 8/1889 | Young | 416/207 |
|---|---|---|---|---|---|
| 705,866 | A | * | 7/1902 | Punzelt | 416/207 |
| 3,357,496 | A | * | 12/1967 | Petersen | 416/207 |
| 3,545,885 | A | | 12/1970 | Killam | |
| 3,565,547 | A | | 2/1971 | Hansen | |
| 3,790,304 | A | * | 2/1974 | Langlois | 416/207 |
| 3,792,937 | A | | 2/1974 | Chilman | |
| 4,053,259 | A | | 10/1977 | Bianchi | |
| 4,150,921 | A | | 4/1979 | Wennberg et al. | |
| 4,213,057 | A | | 7/1980 | Are | |
| 4,275,993 | A | | 6/1981 | Sprengling | |
| 4,579,510 | A | | 4/1986 | Christensen-Dalsgaard | |
| 4,600,362 | A | | 7/1986 | Vostermans et al. | |
| 4,610,600 | A | | 9/1986 | Bleier | |
| 4,630,999 | A | | 12/1986 | De La Harpe | |
| 4,692,097 | A | | 9/1987 | Bibollet | |
| 4,844,697 | A | | 7/1989 | Johansen | |
| 4,934,904 | A | * | 6/1990 | Kennedy | 416/207 |
| 5,123,814 | A | | 6/1992 | Burdick et al. | |
| 5,520,515 | A | | 5/1996 | Bailey et al. | |
| 5,611,665 | A | | 3/1997 | Angel | |
| 6,042,333 | A | | 3/2000 | Day | |
| 6,126,399 | A | | 10/2000 | Bartley et al. | |
| 6,250,886 | B1 | | 6/2001 | Immell et al. | |
| 6,378,322 | B1 | * | 4/2002 | Calvert | 416/207 |

FOREIGN PATENT DOCUMENTS

| WO | WO 97/41355 | 11/1997 |
|---|---|---|
| WO | WO 00/69719 | 11/2000 |

* cited by examiner

*Primary Examiner*—Igor Kershteyn

(57) ABSTRACT

A rotor for a turbomachine. The rotor comprises a hub including a peripheral surface, a first side surface, and a second side surface. The hub defines a plurality of cavities, each one of the cavities extending inwardly from the peripheral surface. The hub also defines a plurality of openings, each one of the openings extending from a corresponding one of the cavities to at least one of the first side surface and the second side surface. The rotor further comprises a blade coupled to the hub. The blade includes an end portion fitting in a particular one of the cavities and screwably secured to the hub. A particular one of the openings extending from the particular one of the cavities is adapted to receive a constraint element engaging the end portion.

47 Claims, 13 Drawing Sheets

ROTOR FOR A TURBOMACHINE

FIELD OF THE INVENTION

The present invention relates to turbomachinery and, more particularly, to a rotor for a turbomachine.

BACKGROUND

A turbomachine is a device that adds or extracts energy to or from a fluid stream through dynamic interactions between the fluid stream and a rotating rotor of the turbomachine. The rotor typically includes a hub to which are coupled a plurality of blades. One factor influencing the dynamic interactions between the fluid stream and the rotating rotor, and thus the performance of the turbomachine, is the blade pitch angle of each one of the blades. For a given blade, the blade pitch angle is the angle between a chord of a section of the blade and a line perpendicular to an axis of rotation of the rotor.

One type of turbomachine is an axial-flow fan. An axial-flow fan typically includes a rotor disposed in a housing and coupled to a motor operative for rotating the rotor. Through rotation of its rotor, an axial-flow fan is operative to produce currents in order to circulate, exhaust, or deliver volumes of a gas such as air. As mentioned previously for turbomachines in general, one factor influencing the dynamic interactions between the gas and the axial-flow fan's rotating rotor, and thus the performance of the axial-flow fan, is the blade pitch angle of each one of the blades of the axial-flow fan's rotor.

Existing rotors for axial-flow fans suffer from multiple drawbacks. One of these drawbacks is that, typically, the coupling means by which a blade of an existing rotor is coupled to the rotor's hub is also the sole means directed to maintaining the blade pitch angle of the blade at a given value.

When an axial-flow fan including such an existing rotor is in operation over an extended period of time, dynamic effects such as vibrations experienced by the rotating rotor can affect the coupling between the blades and the hub of the rotor, and can thus lead to undesired variations of the blade pitch angle of the blades. Such undesired variations usually lead to less than optimal performance of the axial-flow fans including existing rotors. For instance, frequent and inconvenient interruptions of the operation of an axial-flow fan including such an existing rotor may be required in order to periodically adjust the blade pitch angle of the blades of the rotor, which continually drifts from its desired value under operation of the axial-flow fan.

Accordingly, there is a need for improvements in rotors for turbomachines and, in particular, for improvements directed to at least partly inhibiting undesired variations of the blade pitch angle of the blades of a rotor.

SUMMARY OF THE INVENTION

In accordance with a first broad aspect, the invention seeks to provide, in combination, a rotor hub and a rotor blade adapted to be coupled to the rotor hub. The rotor hub includes a peripheral surface, a first side surface, and a second side surface. The rotor hub defines a plurality of cavities, each one of the cavities extending inwardly from the peripheral surface. The rotor hub also defines a plurality of openings, each one of the openings extending from a corresponding one of the cavities to at least one of the first side surface and the second side surface. The rotor blade includes an end portion adapted to fit in a particular one of the cavities and screwably securable to the rotor hub. A particular one of the openings extending from the particular one of the cavities is adapted to receive a constraint element engaging the end portion when the end portion is secured to the rotor hub.

In accordance with a second broad aspect, the invention seeks to provide a rotor for a turbomachine. The rotor comprises a hub including a peripheral surface, a first side surface, and a second side surface. The hub defines a plurality of cavities, each one of the cavities extending inwardly from the peripheral surface. The hub also defines a plurality of openings, each one of the openings extending from a corresponding one of the cavities to at least one of the first side surface and the second side surface. The rotor further comprises a blade coupled to the hub. The blade includes an end portion fitting in a particular one of the cavities and screwably secured to the hub. A particular one of the openings extending from the particular one of the cavities is adapted to receive a constraint element engaging the end portion.

In accordance with a third broad aspect, the invention seeks to provide a rotor for a turbomachine. The rotor comprises a hub including a peripheral surface, a first side surface, and a second side surface. The hub defines a plurality of cavities, each one of the cavities extending inwardly from the peripheral surface. The hub also defines a plurality of openings, each one of the openings extending from a corresponding one of the cavities to at least one of the first side surface and the second side surface. The rotor further comprises a plurality of blades coupled to the hub, each one of the blades including an end portion. For each particular blade of the blades, the end portion fits in a respective one of the cavities and is screwably secured to the hub, and a respective one of the openings extending from the respective one of the cavities is adapted to receive a constraint element engaging the end portion.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of specific embodiments of the present invention is provided herein below, by way of example only, with reference to the accompanying drawings, in which.

Figure 1:
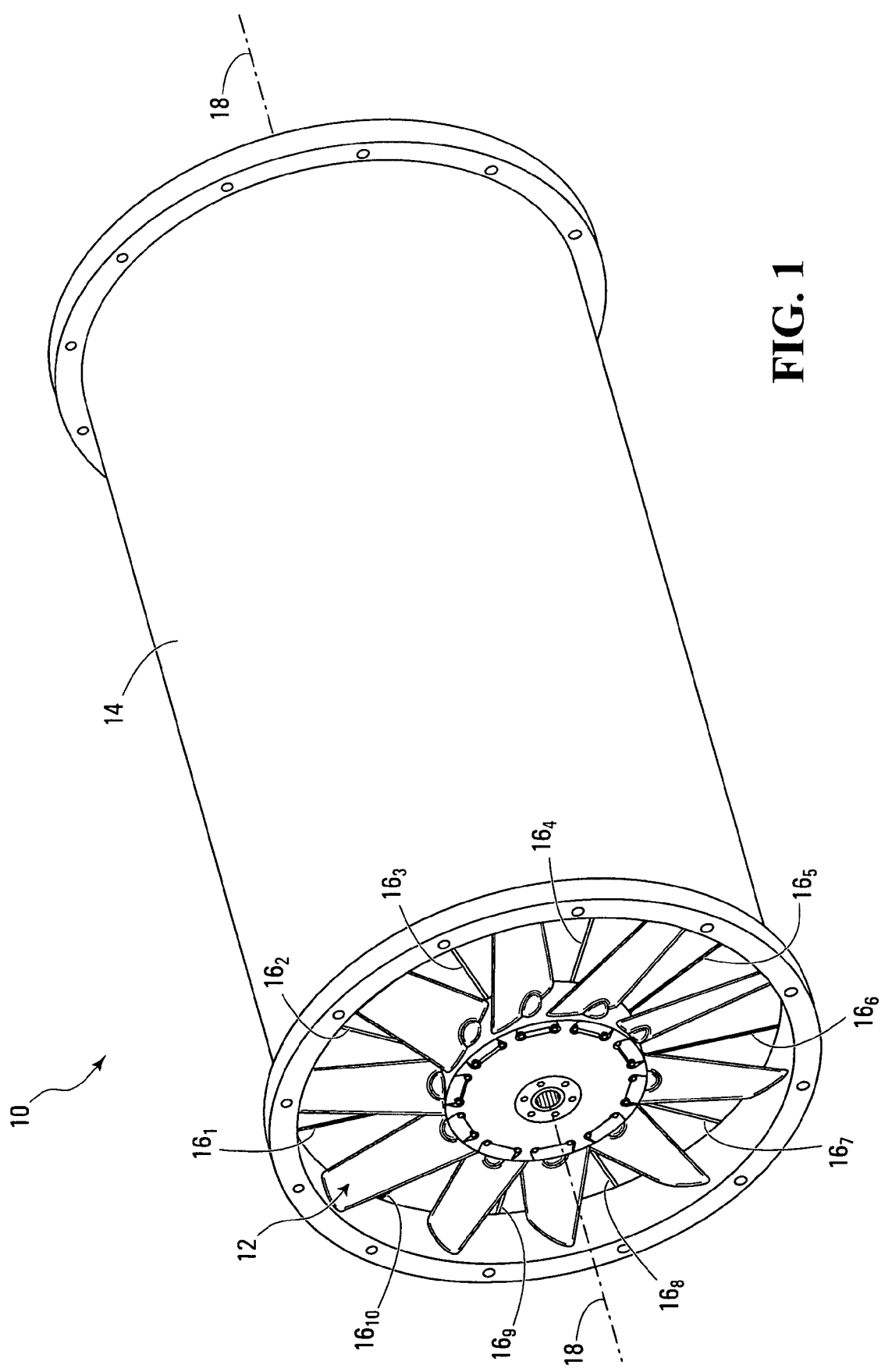
FIG. 1 is a diagrammatic perspective view of an axial-flow fan comprising a rotor in accordance with a first specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF EMBODIMENTS

FIG. 1 shows an axial-flow fan 10 comprising a rotor 12 in accordance with a first specific example of implementation of the present invention. In this particular example, the axial-flow fan 10 also comprises a housing 14 in which is disposed the rotor 12, a plurality of guide vanes $16_1$–$16_{10}$, and a motor (not shown) coupled to the rotor 12. The rotor 12 has an axis of rotation 18 and the motor, when activated, is operative to rotate the rotor 12 about its axis of rotation 18. Through rotation of the rotor 12, the axial-flow fan 10 is operative to produce currents in order to circulate, exhaust, or deliver volumes of a gas such as air.

The axial-flow fan 10 can be used in a variety of applications such as mining, industrial, construction, agricultural, forestry, and leisure applications, as well as any other conceivable application in which it is desired to circulate, exhaust, or deliver volumes of a gas. Furthermore, although FIG. 1 illustrates an example of implementation of the rotor 12 in which the rotor 12 is used in an axial-flow fan, it is to be understood that the rotor 12 of the present invention can be used in any other type of turbomachine interacting with any type of fluid.

FIGS. 2A to 2F illustrate various views of the example of implementation of the rotor 12 of the axial-flow fan 10 shown in FIG. 1. In the example of implementation shown, the rotor 12 comprises a hub 20 and a plurality of blades $22_1$–$22_{10}$ coupled to the hub 20.

As described in further detail below, the rotor 12 is configured to enable coupling and uncoupling of any particular one of the blades $22_1$–$22_{10}$ to and from the hub 20 without requiring coupling or uncoupling of the other ones of the blades $22_1$–$22_{10}$. Furthermore, the rotor 12 is configured to allow setting or adjustment of the blade pitch angle θ of any particular one of the blades $22_1$–$22_{10}$ without requiring manipulation of the other ones of the blades $22_1$–$22_{10}$. As shown in FIG. 2F for a given blade $22_i$, which can be any one of the blades $22_1$–$22_{10}$, the blade pitch angle θ of the blade $22_i$ is the angle between a chord of a section of the blade $22_i$ and a line perpendicular to the axis of rotation 18 of the rotor 12.

Advantageously, in addition to allowing independent setting or adjustment of the blade pitch angle θ of any particular one of the blades $22_1$–$22_{10}$, the rotor 12 is configured to enable such setting or adjustment without requiring removal of the rotor 12 from the housing 14 (FIG. 1) and/or uncoupling of the rotor 12 from the motor of the axial-flow fan 10 (FIG. 1). That is, the rotor 12 is configured such that the blade pitch angle θ of any particular one of the blades $22_1$–$22_{10}$ can be set or adjusted to a given value while leaving the rotor 12 coupled to the motor and within the housing 14 of the axial-flow fan 10.

Moreover, and also as described in further detail below, for each given blade $22_i$ of the blades $22_1$–$22_{10}$, the rotor 12 is configured to allow usage of an element directed to maintaining the blade pitch angle θ of the blade $22_i$ at its set value, the element being in addition to, and independent of, the primary means by which the blade $22_i$ is coupled to the hub 20. As described below, this element at least partly inhibits undesired variations of the blade pitch angle θ of the blade $22_i$ which could otherwise occur as a result of dynamic effects such as vibrations of the rotor 12 when the axial-flow fan 10 (FIG. 1) is operated over an extended period of time.

With continued reference to FIGS. 2A to 2F, the hub 20 includes a peripheral surface 24, a first side surface $26_1$, and a second side surface $26_2$. In the particular example of implementation shown, the hub 20 defines a plurality of cavities $28_1$–$28_{10}$ extending inwardly from the peripheral surface 24. The hub 20 also defines a plurality of openings $32_1$–$32_{10}$ extending between the first side surface $26_1$ and the second side surface $26_2$.

In this particular example of implementation, the hub 20 also defines a bore for receiving a fitting 34 secured to the hub 20, the fitting 34 being adapted to receive a shaft of the motor of the axial-flow fan 10 (FIG. 1). The rotor 12 can be coupled to the motor of the axial-flow fan 10 by coupling the shaft of the motor to the fitting 34 via a key/keyway arrangement distributed among the shaft of the motor and the fitting 34. In other examples of implementation, the fitting 34 can be omitted and the rotor 12 can be coupled to the motor of the axial-flow fan 10 by directly coupling the shaft of the motor to the bore of the hub 20 via a key/keyway arrangement distributed among the shaft of the motor and the bore of the hub 20.

Advantageously, in the non-limiting example of implementation shown, the hub 20 is a single-piece hub made of metal and manufactured by a casting process. In other examples of implementation, the hub 20 can be made of multiple pieces and can be made of various other materials such as polymers, ceramics, and/or composites using various other manufacturing processes without departing from the scope of the present invention.

In the particular example of implementation shown in FIGS. 2A to 2F, the peripheral surface 24 is substantially cylindrical such that the hub 20 essentially has a cylindrical configuration. It is to be understood, however, that the peripheral surface 24 of the hub 20 can have various other configurations, including polygonal configurations, and thus that the hub 20 can have various other configurations without leaving the scope of the present invention. Furthermore, in the specific example of implementation shown, each one of the cavities $28_1$–$28_{10}$ extends generally radially in the hub 20 from the peripheral surface 24. In this particular case, each one of the cavities $28_1$–$28_{10}$ has a cylindrical configuration. It is to be understood, however, that various other configurations and orientations are possible for the cavities $28_1$–$28_{10}$ while remaining within the scope of the present invention. Moreover, although the rotor 12 shown in FIGS. 2A to 2D includes ten blades $22_1$–$22_{10}$, ten cavities $28_1$–$28_{10}$, and ten openings $32_1$–$32_{10}$, it is to be understood that the rotor 12 can include any number of blades, any number of cavities, and any number of openings without departing from the scope of the present invention.

With continued reference to FIGS. 2A to 2F, each one of the cavities $28_1$–$28_{10}$ has a threaded part 30 located therein. In the particular example of implementation shown, the threaded part 30 of a given cavity $28_i$ of the cavities $28_1$–$28_{10}$ is an externally threaded part projecting outwardly from a bottom of the cavity $28_i$ towards the peripheral surface 24. The externally threaded part 30 of each one of the cavities $28_1$–$28_{10}$ can be formed integrally with the hub 20. For example, the externally threaded part 30 of a given cavity $28_i$ of the cavities $28_1$–$28_{10}$ can be formed by providing a projecting portion in the cavity $28_i$ during casting of the hub 20 and subsequently machining threads on the projecting portion.

In other examples of implementation, the threaded part 30 of a given cavity $28_i$ of the cavities $28_1$–$28_{10}$ can be an internally threaded part that can be realized, for instance, by tapping a hole formed at a bottom of the cavity $28_i$. In such examples of implementation, an externally threaded element, such as a stud or a bolt, can be screwed in the tapped hole of the cavity $28_i$, thereby effectively providing the functionality of an externally threaded part for the cavity $28_i$.

Figure 5A:
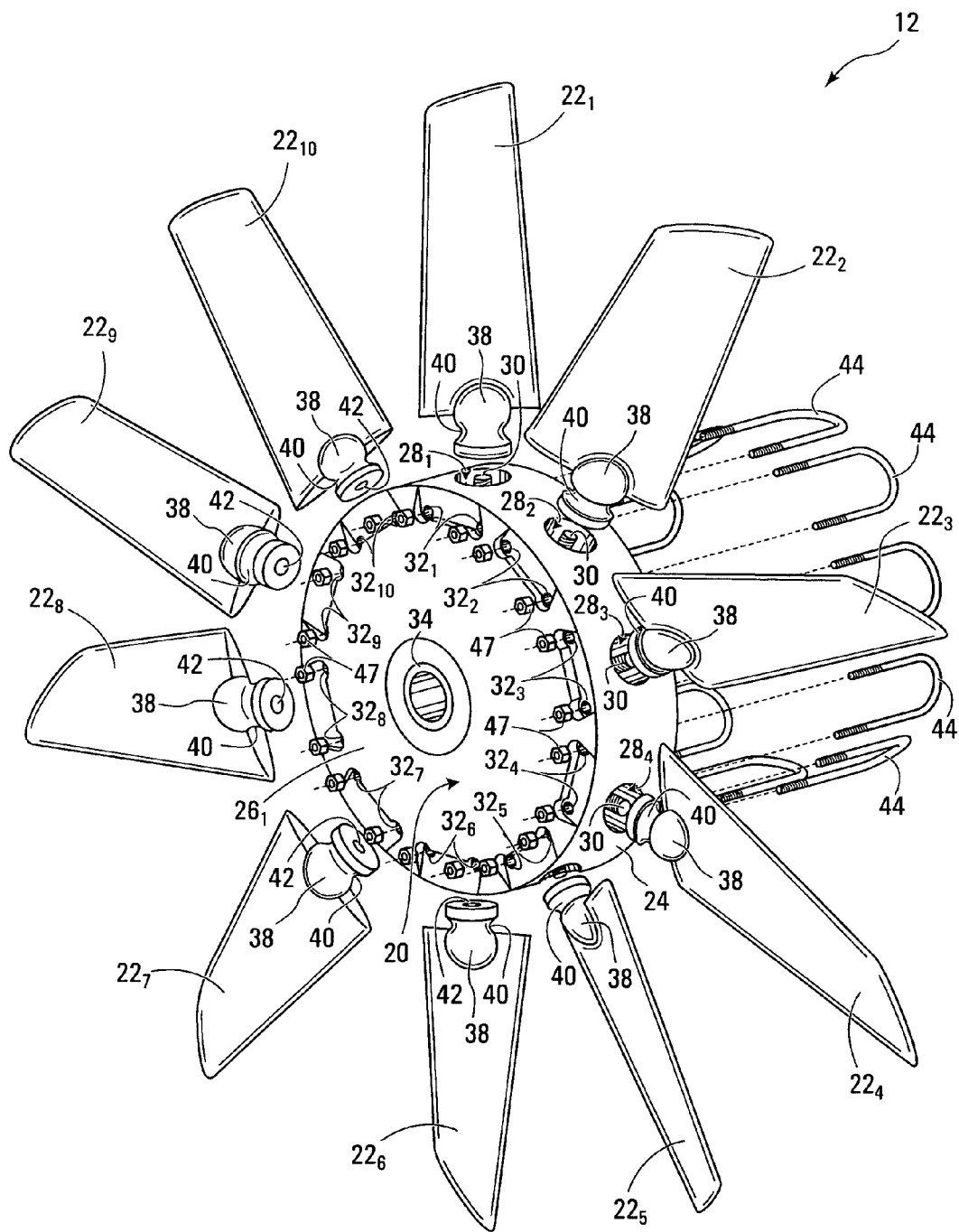
FIG. 5A is a diagrammatic front perspective view of a rotor in accordance with a third specific example of implementation of the present invention, illustrating a hub of the rotor and blades of the rotor which are adapted to be coupled to the hub.
Figure 5B:
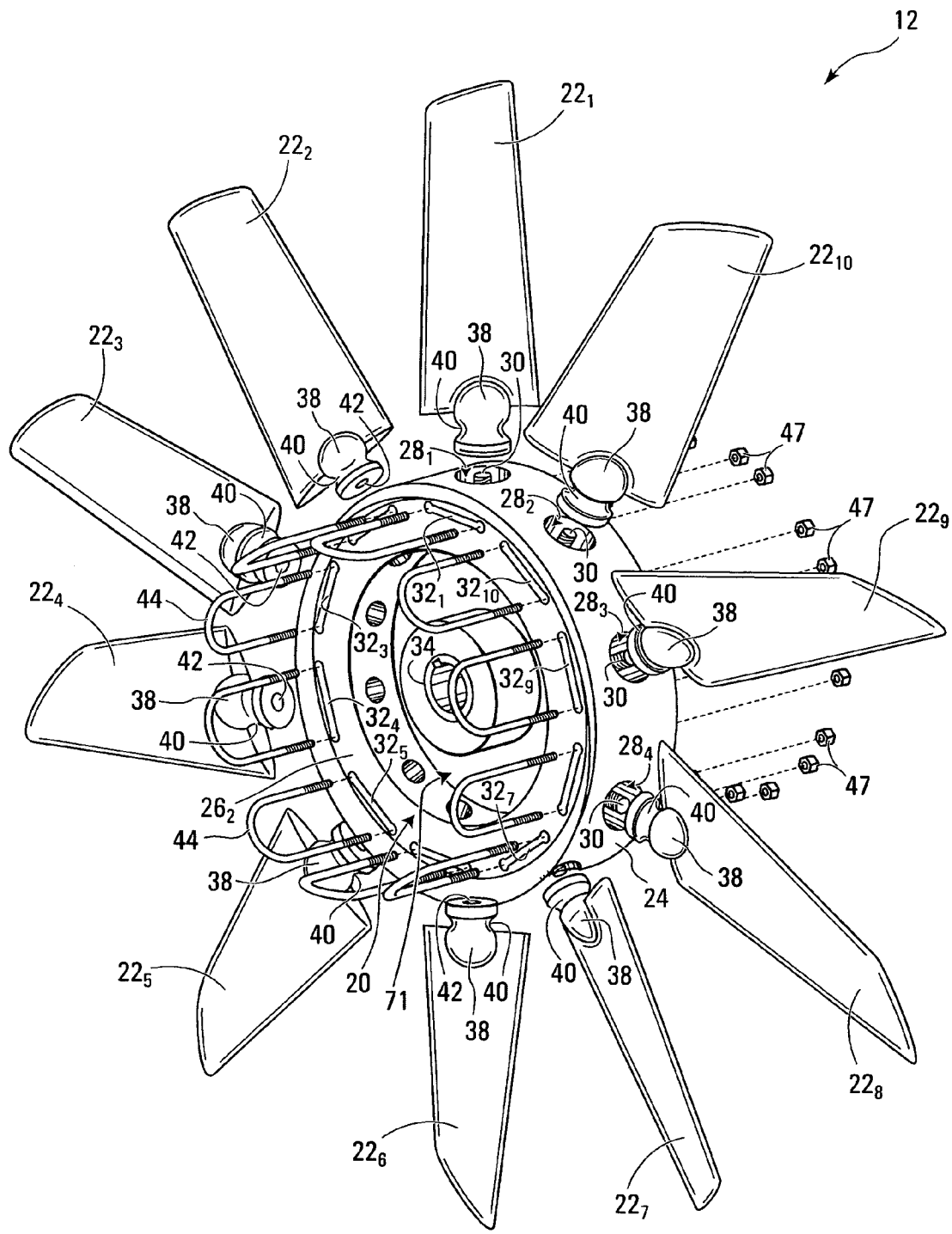
FIG. 5B is a diagrammatic rear perspective view of the hub and the blades of the rotor shown in FIG. 5A.
Figure 5C:
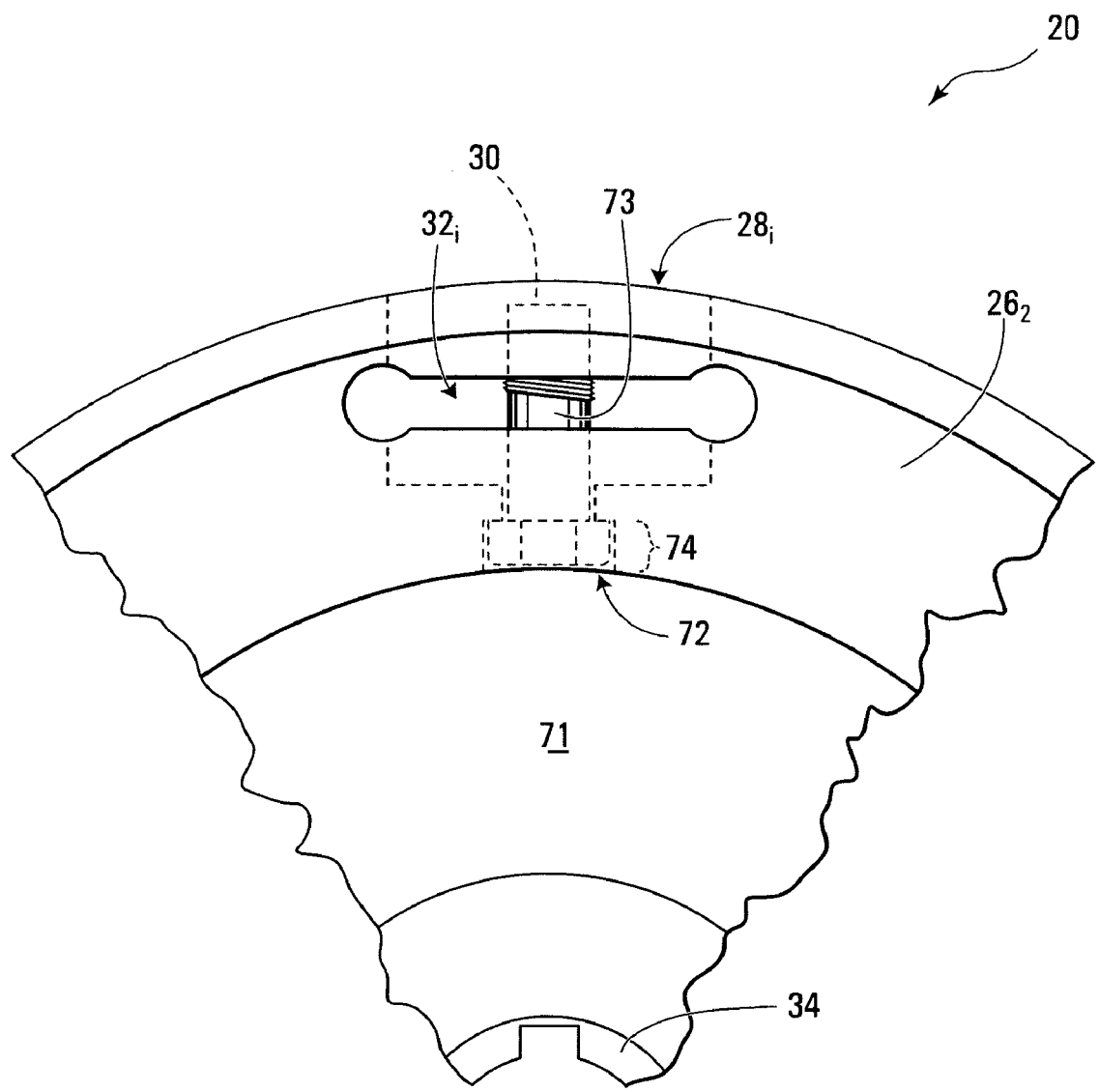
FIG. 5C is a diagrammatic plan view of a portion of the rear of the hub of the rotor shown in FIG. 5B.

In yet other examples of implementation, the threaded part 30 of a given cavity $28_i$ of the cavities $28_1$–$28_{10}$ can be an externally threaded part in the form of an externally threaded element, such as a stud or a bolt, that is positioned in a hole formed at the bottom of the cavity $28_i$. FIGS. 5A to 5C illustrate such an example of implementation. In the non-limiting example of implementation shown in FIGS. 5A to 5C, the hub 20 has a depressed portion 71 and defines a respective hole 72 extending from the bottom surface of each one of the cavities $28_1$–$28_{10}$ to the depressed portion 71. The hole 72 associated with a given cavity $28_i$ of the cavities $28_1$–$28_{10}$ is sized to receive an externally threaded element, in this particular case, a bolt 73. Advantageously, the hole 72 has a section 74 with a configuration that matches the configuration of the head of the bolt 73. In this particular case, the section 74 has an hexagonal configuration matching the hexagonal configuration of the head of the bolt 73. This acts to promote retention of the bolt 73 in the hole 72, for instance, by way of a tight fit between the head of the bolt 73 and the section 74 of the hole 72, as well as to prevent rotation of the bolt 73 relative to the hole 72. When a given blade $22_i$ of the blades $22_1$–$22_{10}$ is positioned in the cavity $28_i$ and coupled to the hub 20 via the bolt 73 and its own threaded part, which is described in further detail below, the bolt 73 is constrained to remain in the hole 72.

Figure 2A:
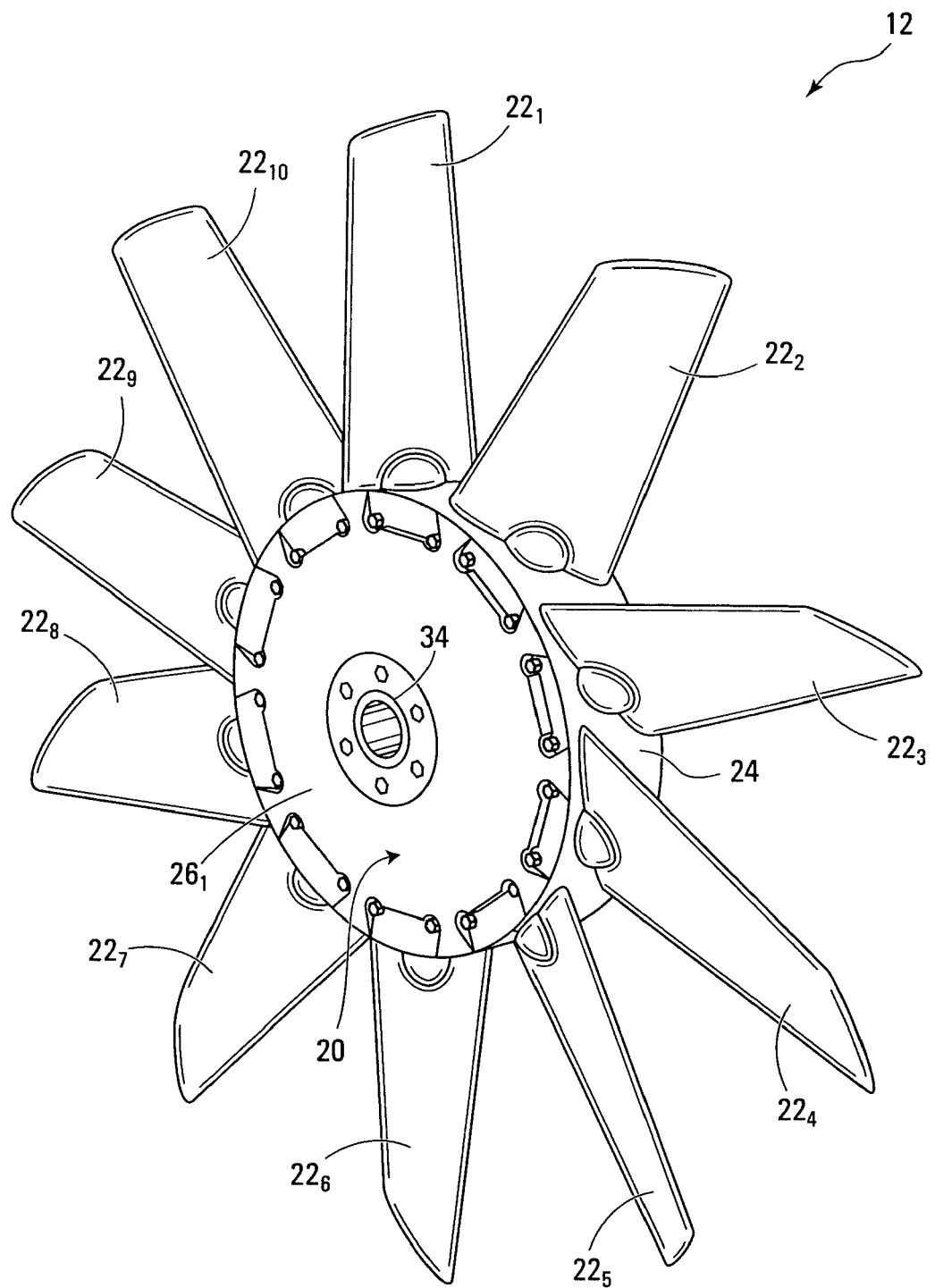
FIG. 2A is a diagrammatic front perspective view of the rotor shown in FIG. 1.
Figure 2B:
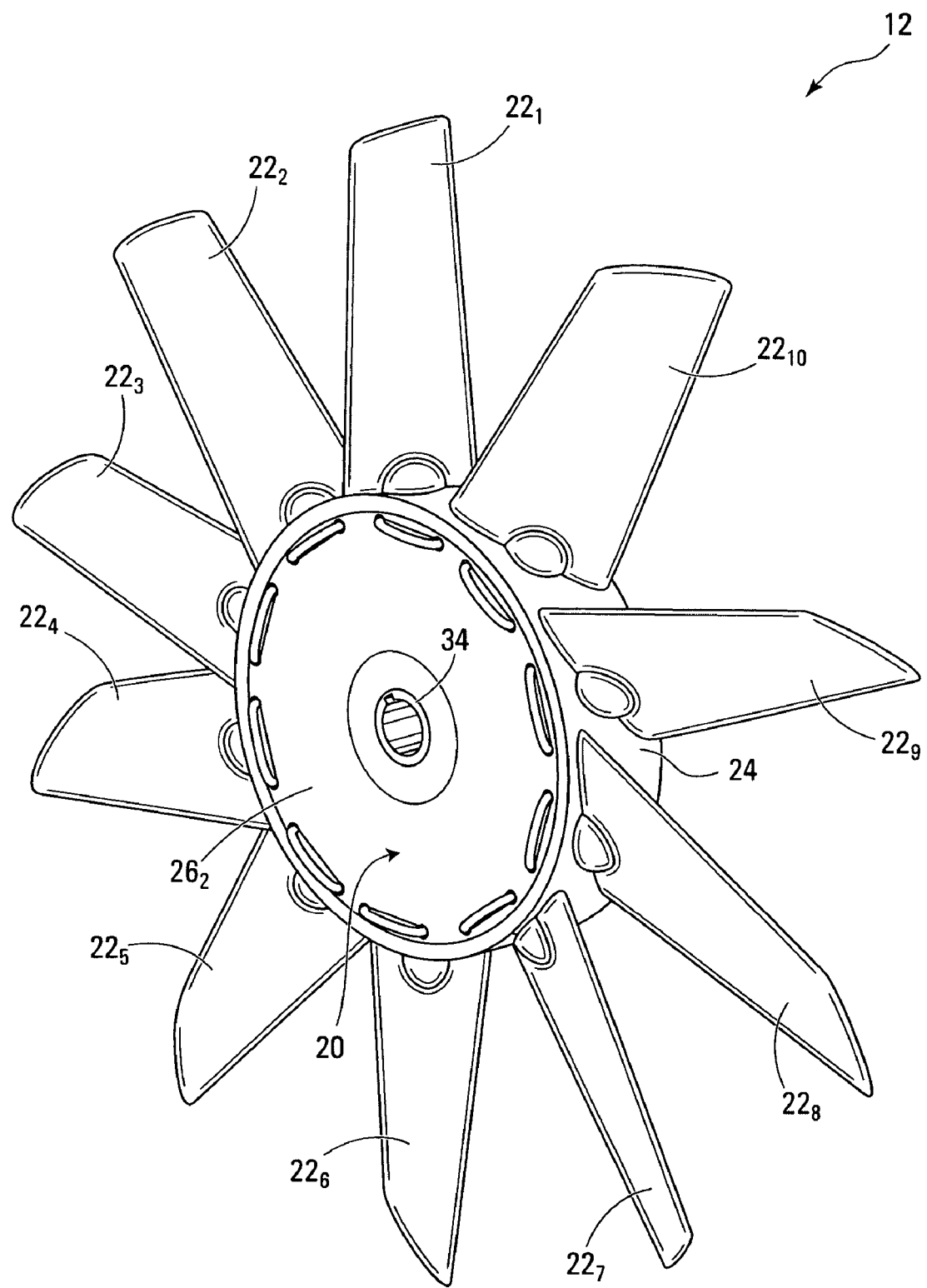
FIG. 2B is a diagrammatic rear perspective view of the rotor shown in FIG. 2A.
Figure 2C:
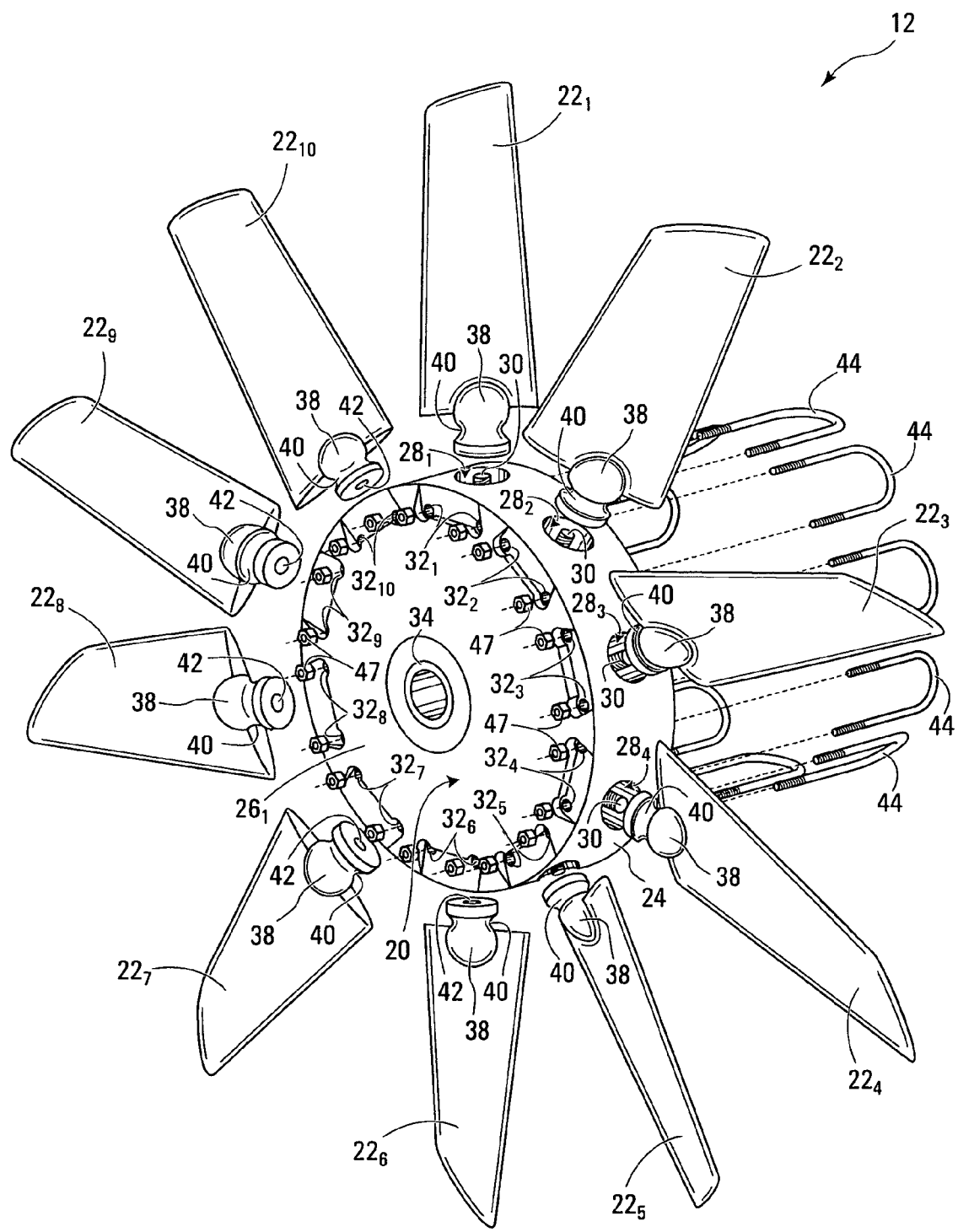
FIG. 2C is a diagrammatic front perspective view of a hub of the rotor shown in FIG. 2A and of blades of the rotor which are adapted to be coupled to the hub.
Figure 2D:
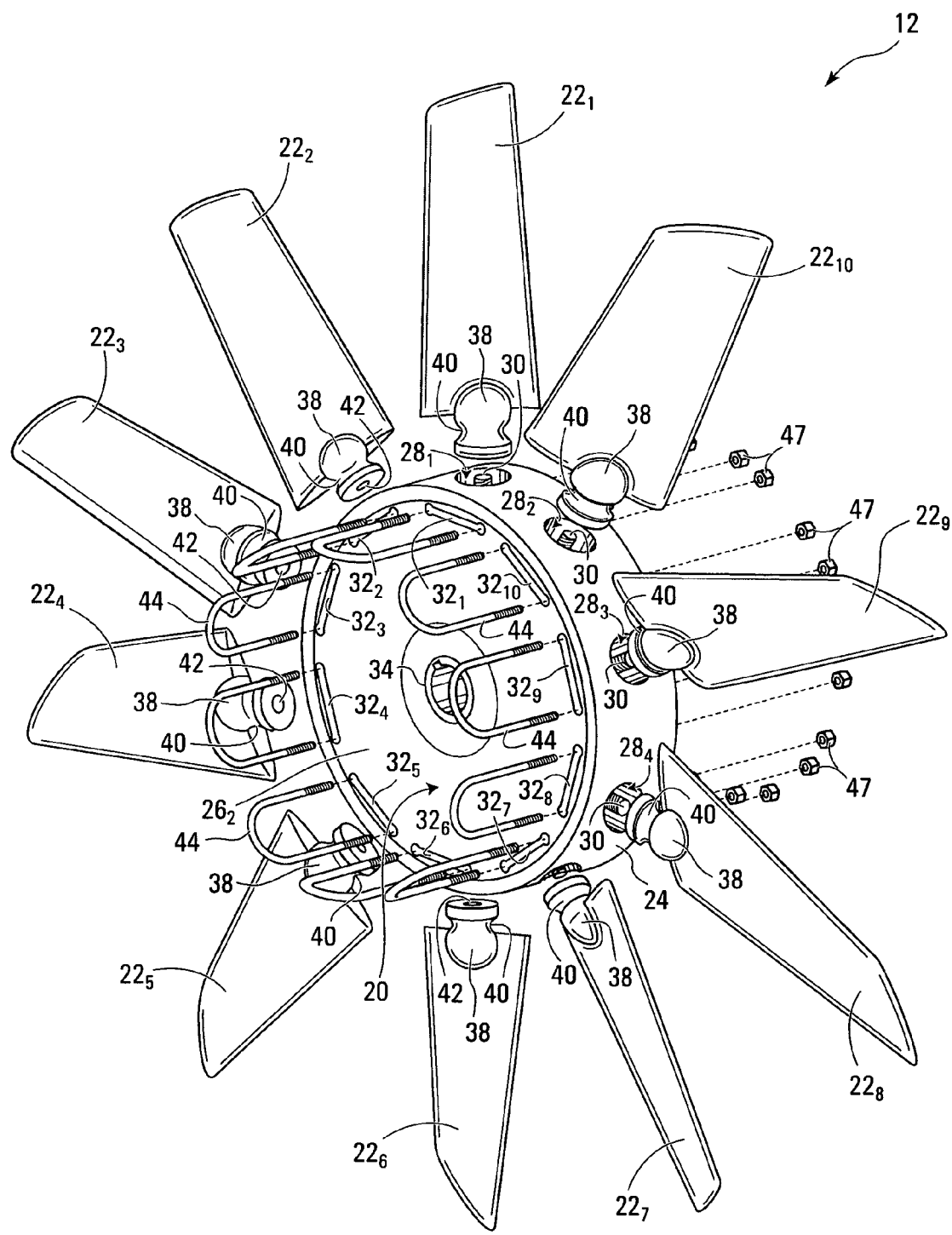
FIG. 2D is a diagrammatic rear perspective view of the hub and the blades of the rotor shown in FIG. 2C.
Figure 2E:
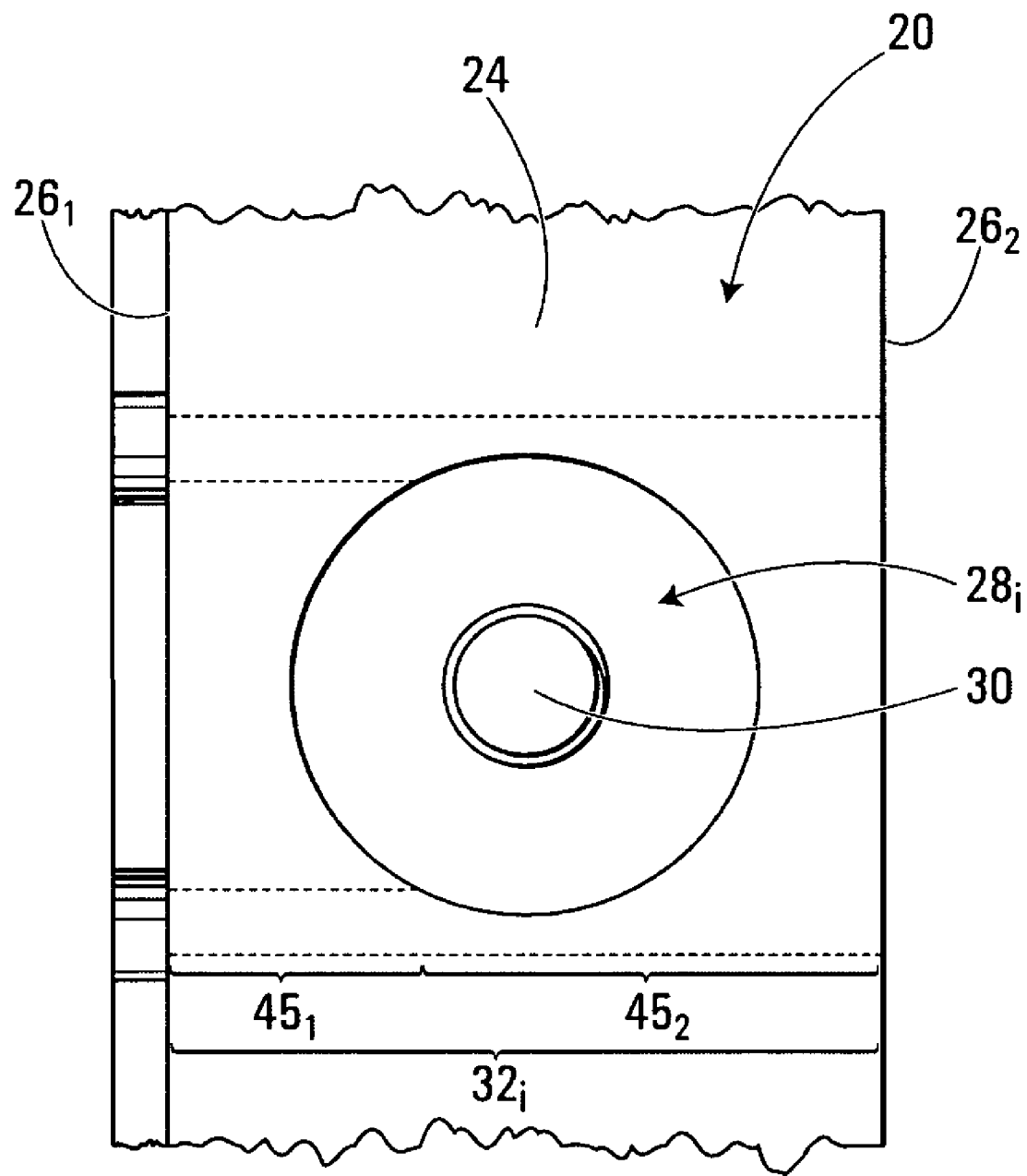
FIG. 2E is a diagrammatic plan view of a portion of a peripheral surface of the hub of the rotor shown in FIG. 2C.
Figure 2F:
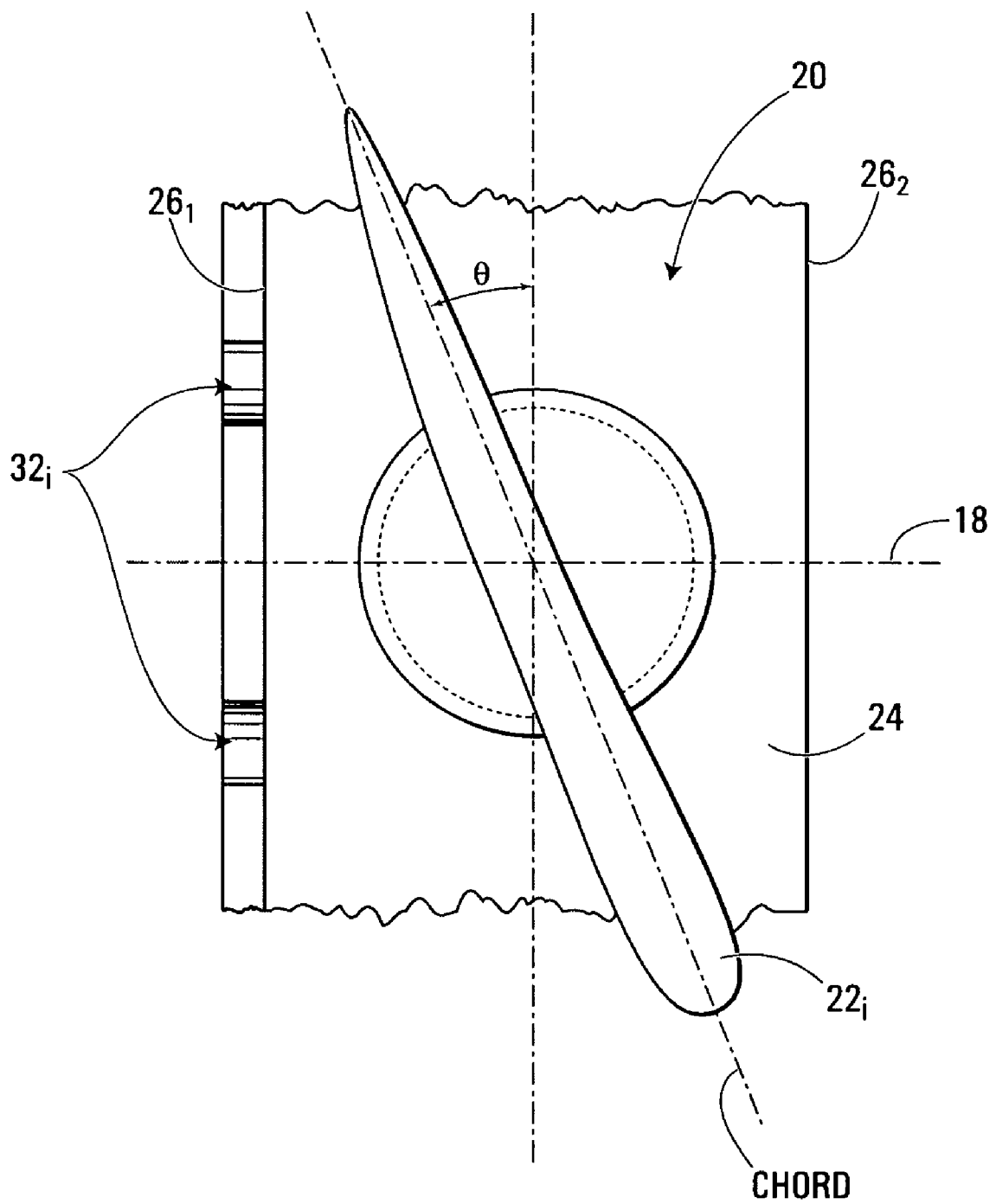
FIG. 2F illustrates the blade pitch angle of a blade of the rotor shown in FIG. 2A.

With renewed reference to FIGS. 2A to 2F, each one of the openings $32_1$–$32_{10}$ extends from a corresponding one of the cavities $28_1$–$28_{10}$ to both the first side surface $26_1$ and the second side surface $26_2$. Each one of the openings $32_1$–$32_{10}$ can be conceptually divided into a first section $45_1$ and a second section $45_2$. As shown in FIG. 2E, the second section $45_2$ of a given opening $32_i$ of the openings $32_1$–$32_{10}$ extends between the second side surface $26_2$ and a corresponding cavity $28_i$ of the cavities $28_1$–$28_{10}$, while the first section $45_1$ of the opening $32_i$ is aligned with the second section $45_2$ of the opening $32_i$ and extends to the first side surface $26_1$. In this particular case, the second section $45_2$ of each one of the openings $32_1$–$32_{10}$ is essentially configured as a slot and the first section $45_1$ of each one of the openings $32_1$–$32_{10}$ consists of two holes, which define therebetween a distance substantially corresponding to a width of the slot. Although the example of implementation shown in FIGS. 2A to 2F depicts a certain size and configuration for each one of the openings $32_1$–$32_{10}$, it is to be understood that various other sizes and configurations are possible for each one of the openings $32_1$–$32_{10}$ without departing from the scope of the present invention.

With continued reference to FIGS. 2A to 2F, each one of the blades $22_1$–$22_{10}$ includes an end portion 38 having a groove 40 and a threaded part 42. The end portion 38 of a given blade $22_i$ of the blades $22_1$–$22_{10}$ is adapted to fit in a respective cavity $28_i$ of the cavities $28_1$–$28_{10}$ and is screwably securable to the hub 20, i.e. the end portion 38 of the blade $22_i$ is securable to the hub 20 via a screwlike coupling. In this particular case, the end portion 38 of the blade $22_i$ is screwably securable to the hub 20 via its threaded part 42 and the threaded part 30 of the cavity $28_i$. Thus, the blade $22_1$ is adapted to fit in the cavity $28_1$ and is screwably securable to the hub 20 via its threaded part 42 and the threaded part 30 of the cavity $28_1$. Similarly, the blade $22_2$ is adapted to fit in the cavity $28_2$ and is screwably securable to the hub 20 via its threaded part 42 and the threaded part 30 of the cavity $28_2$, and so on.

The end portion 38 of each one of the blades $22_1$–$22_{10}$ has a configuration allowing it to be positioned in the respective one of the cavities $28_1$–$28_{10}$ in which it is to be positioned. In the specific example of implementation shown, the configuration of the end portion 38 of each one of the blades $22_1$–$22_{10}$ is generally cylindrical and substantially matches the cylindrical configuration of the cavities $28_1$–$28_{10}$. In other examples of implementation, the end portion 38 of each one of the blades $22_1$–$22_{10}$ can have various other possible configurations and does not need to have a configuration matching that of the cavities $28_1$–$28_{10}$.

In the particular example of implementation of FIGS. 2A to 2F, the threaded part 42 of the end portion 38 of each one of the blades $22_1$–$22_{10}$ is an internally threaded part. The internally threaded part 42 of the end portion 38 of a given blade $22_i$ of the blades $22_1$–$22_{10}$ can be realized, for instance, by tapping a hole formed in the end portion 38 of the blade $22_i$. A given blade $22_i$ of the blades $22_1$–$22_{10}$ is coupled to the hub 20 by screwing its internally threaded part 42 on the externally threaded part 30 of the respective cavity $28_i$ of the cavities $28_1$–$28_{10}$ into which the end portion 38 of the blade $22_i$ is to be positioned. That is, in the example shown, the blade $22_1$ is coupled to the hub 20 by screwing its internally threaded part 42 on the externally threaded part 30 of the cavity $28_1$. Similarly, the blade $22_2$ is coupled to the hub 20 by screwing its internally threaded part 42 on the externally threaded part 30 of the cavity $28_2$, and so on.

Although in the specific example of implementation shown in FIGS. 2A to 2F, the threaded part 30 of each one of the cavities $28_1$–$28_{10}$ is an externally threaded part and the threaded part of each one of the blades $22_1$–$22_{10}$ is an internally threaded part, it is to be understood that various alternatives are possible without departing from the scope of the present invention. Generally, the threaded part 30 of a given one of the cavities $28_1$–$28_{10}$ can be either an externally threaded part or an internally threaded part, and, similarly, the threaded part 42 of a given one of the blades $22_1$–$22_{10}$ can be either an externally threaded part or an internally threaded part. For example, as previously mentioned, the threaded part 30 of a given one of the cavities $28_1$–$28_{10}$ can be an internally threaded part adapted to receive an externally threaded element such as stud or a bolt. As another example, the threaded part 42 of a given blade $22_i$ of the blades $22_1$–$22_{10}$ can be an externally threaded part projecting outwardly from the end portion 38 of the blade $22_i$. The externally threaded part 42 of the blade $22_i$ can be formed integrally with the blade $22_i$. As yet another example, the threaded part 42 of a certain blade $22_i$ of the blades $22_1$–$22_{10}$ can be an internally threaded part (as is the case in the example of implementation of FIGS. 2A to 2F) into which an externally threaded element, such as a stud, can be screwed to effectively provide the functionality of an externally threaded part for the blade $22_i$.

With continued reference to FIGS. 2A to 2F, the groove 40 of the end portion 38 of each one of the blades $22_1$–$22_{10}$ is adapted to receive and be engaged by a constraint element 44 positioned in a respective one of the openings $32_1$–$32_{10}$ when the end portion 38 of each one of the blades $22_1$–$22_{10}$ is secured to the hub 20. That is, the groove 40 of the end portion 38 of the blade $22_i$ is adapted to receive and be engaged by a constraint element 44 positioned in the opening $32_1$ when the end portion 38 of the blade $22_1$ is secured to the hub 20 via its threaded part 42 and the threaded part 30 of the cavity $28_1$. Similarly, the groove 40 of the end portion 38 of the blade $22_2$ is adapted to receive and be engaged by a constraint element 44 positioned in the opening $32_2$ when the end portion 38 of the blade $22_2$ is secured to the hub 20 via its threaded part 42 and the threaded part 30 of the cavity $28_2$, and so on. To that end, a given opening $32_i$ of the openings $32_1$–$32_{10}$ is positioned relative to a respective cavity $28_i$ of the cavities $28_1$–$28_{10}$ such that, when the end portion 38 of a respective blade $22_i$ of the blades $22_1$–$22_{10}$ is positioned in the cavity $28_i$ and is secured to the hub 20, a constraint element 44 positioned in the opening $32_i$ engages the groove 40 of the end portion 38 of the blade $22_i$.

In the particular example of implementation shown, the groove 40 of the end portion 38 of each one of the blades $22_1$–$22_{10}$ extends circumferentially along a perimeter of the end portion 38. The groove 40 of the end portion 38 of a given blade $22_i$ of the blades $22_1$–$22_{10}$ has dimensions allowing it to receive and engage a constraint element 44 positioned in a given opening $32_i$ of the openings $32_1$–$32_{10}$ when the end portion 38 of the blade $22_i$ is secured to the hub 20.

In the example of implementation illustrated in FIGS. 2A to 2F, the constraint element 44 associated with each one of the blades $22_1$–$22_{10}$ is a U-shaped constraint element, in this particular case, a U-bolt. Advantageously, the groove 40 of the end portion 38 of a given blade $22_i$ of the blades $22_1$–$22_{10}$ is configured such that, when the end portion 38 of the blade $22_i$ is secured to the hub 20 and a constraint element 44 is positioned in the respective opening $32_i$ of the openings $32_1$–$32_{10}$ associated with the blade $22_i$, the constraint element 44 wraps partly around the end portion 38 so as to contact the groove 40 along approximately 50% of the perimeter of the end portion 38 at the groove 40. It will be appreciated that it is possible to design the openings $32_1$–$32_{10}$ and select a constraint element 44 with a certain size and configuration such that the constraint element 44 contacts the groove 40 along any other conceivable fraction of the perimeter of the end portion 38 at the groove 40, without departing from the scope of the invention. For example, a given opening $32_i$ of the openings $32_1$–$32_{10}$ can be adapted to receive a constraint element 44 engaging the groove 40 of the end portion 38 of a given blade $22_i$ of the blades $22_1$–$22_{10}$ at at least three points of the perimeter of the end portion 38 at the groove 40, the at least three points being non-collinear, i.e. not lying in a straight line. For instance, the three points can be a point of the perimeter of the end portion 38 located closest to the second side surface $26_2$ when the end portion 38 is secured to the hub 20, and two points of the perimeter of the end portion 38 each located on a respective side of the end portion 38 of the blade $22_i$.

In the example of implementation shown, the constraint element 44 associated with each one of the blades $22_1$–$22_{10}$ is secured to the hub 20 by a pair of nuts 47. When the nuts 47 are tightened, the constraint element 44 associated with a given blade $22_i$ of the blades $22_1$–$22_{10}$ effectively provides a constraint against radial movement of the blade $22_i$ relative to the hub 20. Consequently, the constraint element 44 associated with the blade $22_i$ provides a constraint against undesired unscrewing or screwing of the threaded part 42 of the blade $22_i$ relative to the threaded part 30 of the cavity $28_i$ in which the end portion 38 of the blade $22_i$ is positioned. Since such undesired unscrewing or screwing would normally lead to a variation of the blade pitch angle θ of the blade $22_i$, the constraint element 44 at least partly inhibits a variation of the blade pitch angle θ of the blade $22_i$.

Figure 3:
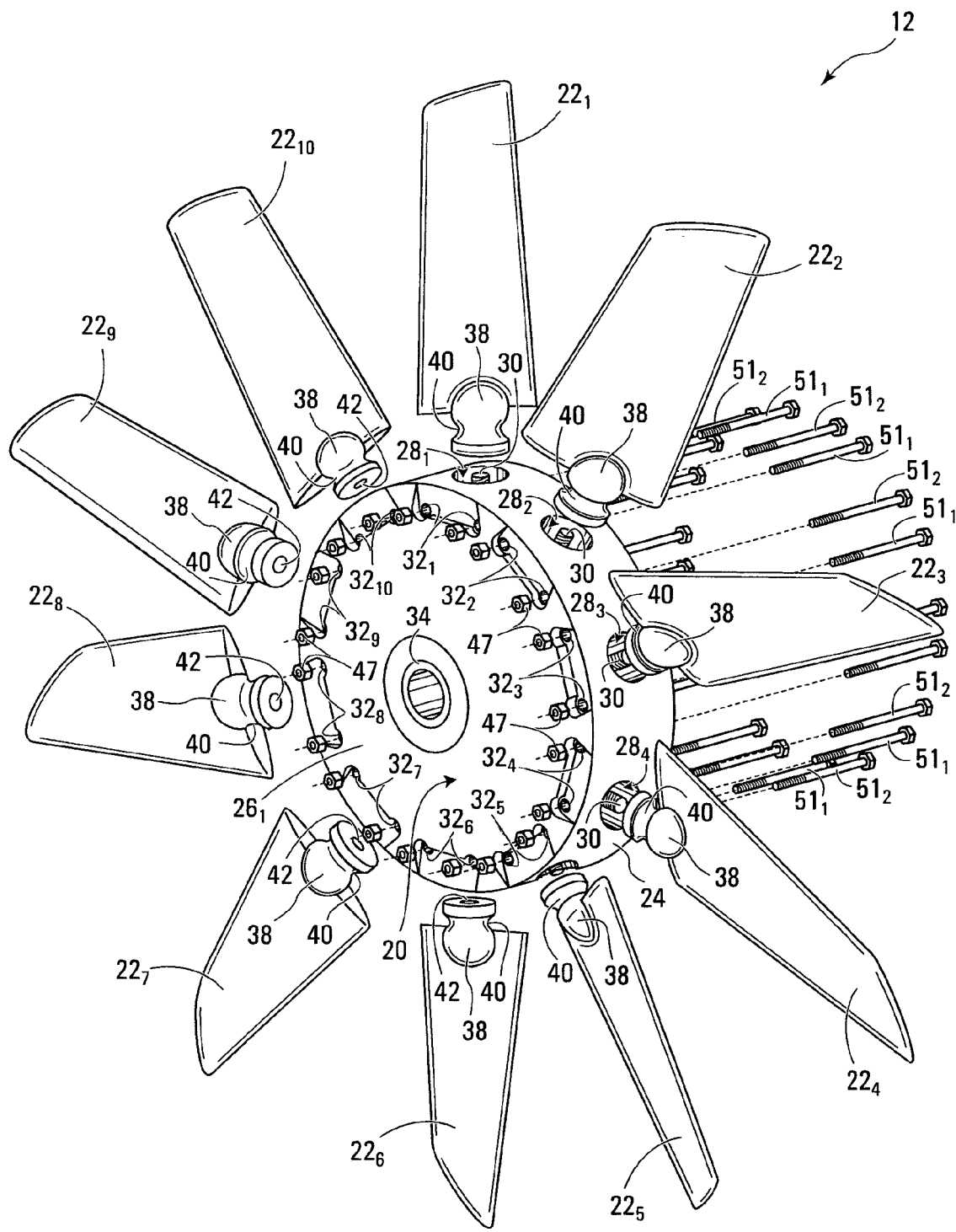
FIG. 3 is a diagrammatic front perspective view of the rotor shown in FIG. 2A, but using a different type of constraint element than that used in FIG. 2A.

While in the example of implementation shown in FIGS. 2A to 2F, the constraint element 44 associated with each one of the blades $22_1$–$22_{10}$ is a U-shaped constraint element, it is to be understood that various other types of constraint elements can be used without departing from the scope of the invention. Generally, a constraint element 44 associated with a given blade $22_i$ can be any element providing a constraint against undesired unscrewing or screwing of the threaded part 42 of the blade $22_i$ relative to the threaded part 30 of the cavity $28_i$ in which the end portion 38 of the blade $22_i$ is positioned. For instance, as shown in the example of implementation of FIG. 3, the constraint element associated with a given blade $22_i$ of the blades $22_1$–$22_{10}$ can be a pair of bolts $51_1$ and $51_2$ each engaging the groove 40 of the blade $22_i$ on a respective side of the end portion 38 of the blade $22_i$ when the end portion 38 is secured to the hub 20. In this particular case, it can be said that the constraint element formed by the bolts $51_1$ and $51_2$ engages the groove 40 of the end portion 38 of the blade $22_i$ at two segments of the perimeter of the end portion 38 at the groove 40, the two segments being non-contiguous.

Furthermore, although in the example of implementation shown in FIGS. 2A to 2F, the end portion 38 of each one of the blades $22_1$–$22_{10}$ has a groove 40, it is to be understood that the groove 40 is optional.

Figure 4A:
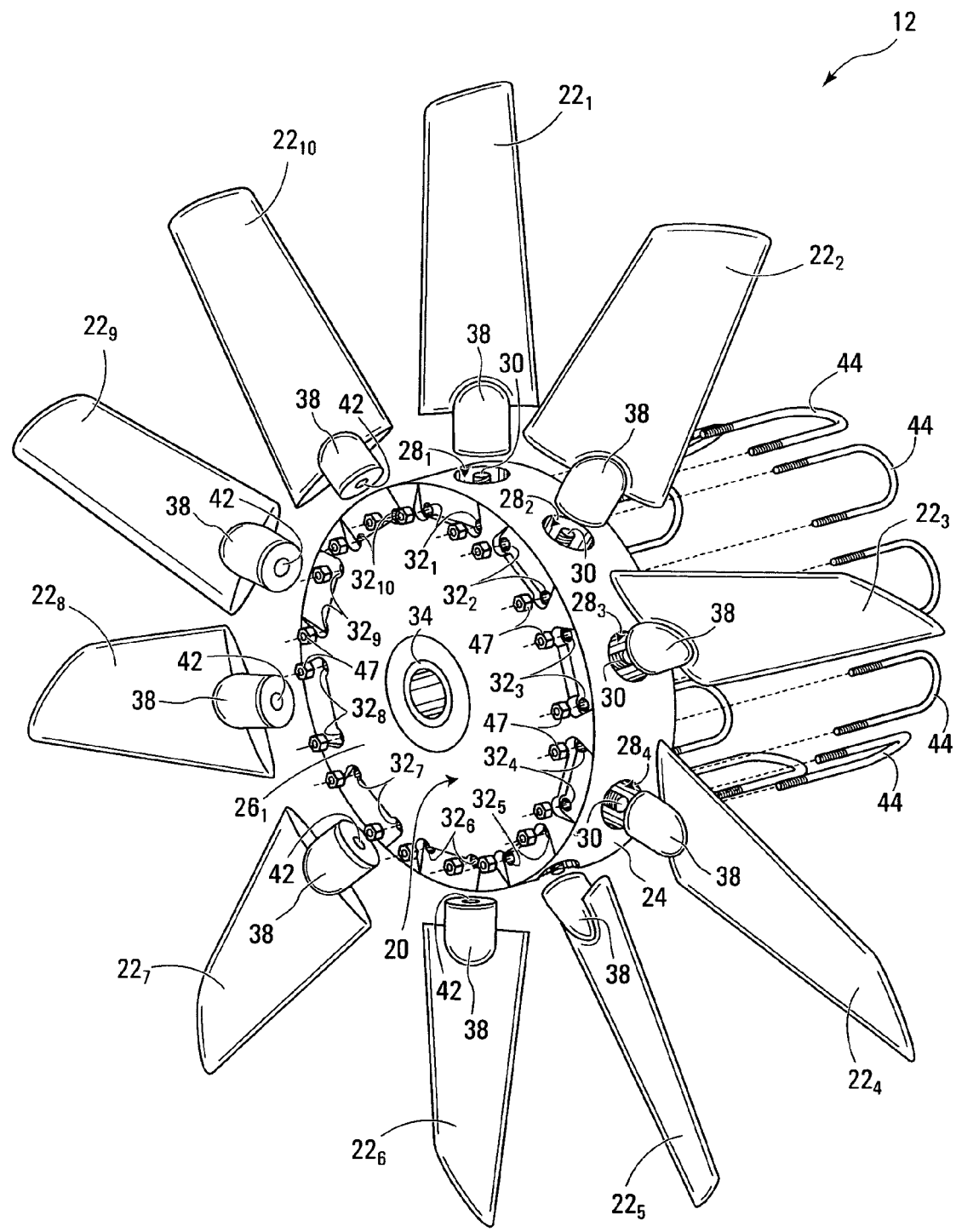
FIG. 4A is a diagrammatic front perspective view of a rotor in accordance with a second specific example of implementation of the present invention, illustrating a hub of the rotor and blades of the rotor which are adapted to be coupled to the hub.
Figure 4B:
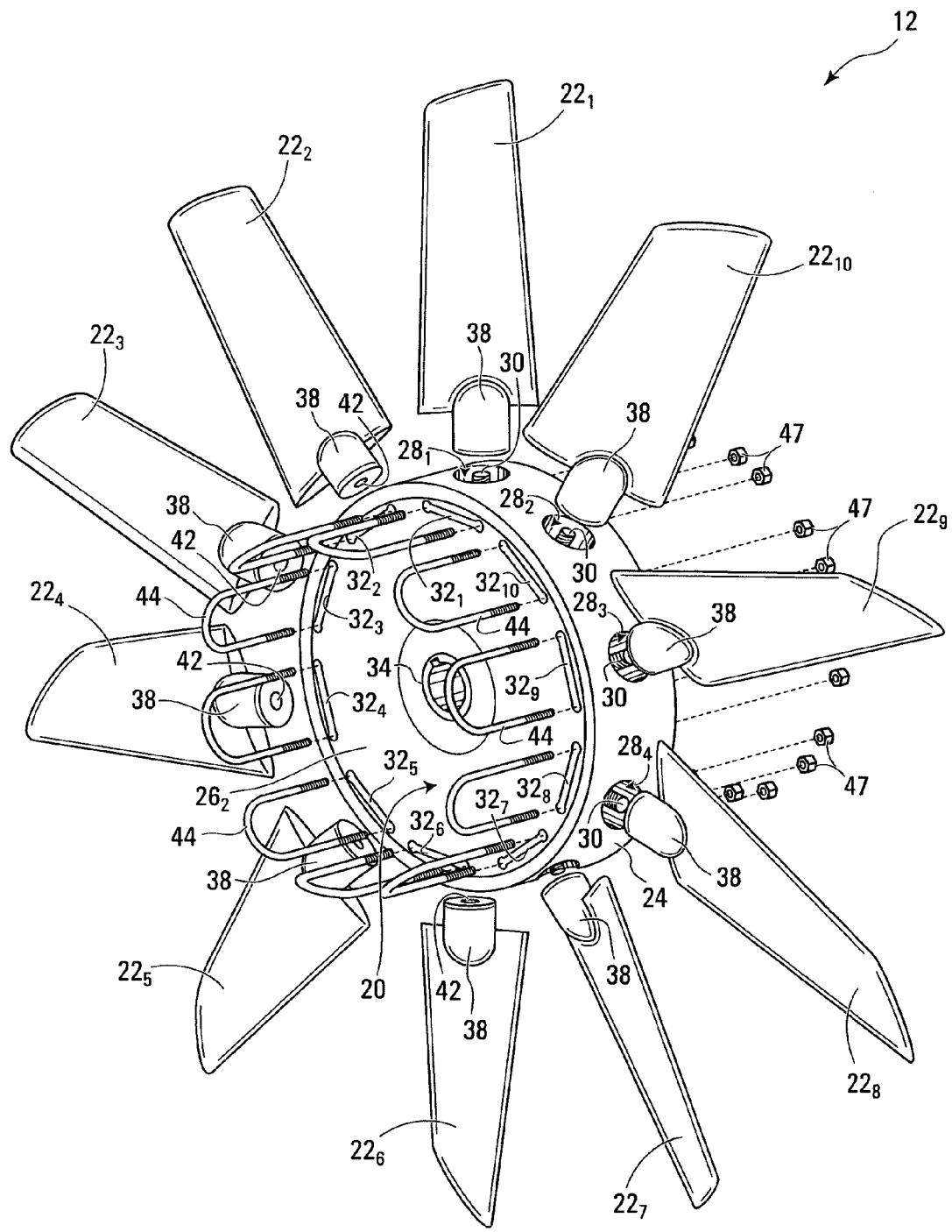
FIG. 4B is a diagrammatic rear perspective view of the hub and the blades of the rotor shown in FIG. 4A.

For instance, FIGS. 4A and 4B illustrate an example of implementation in which the end portion 38 of a given blade $22_i$ of the blades $22_1$–$22_{10}$ is provided without a groove 40. In such a case, the end portion 38 of the blade $22_i$ is adapted to be engaged by a constraint element 44 positioned in the opening $32_i$ of the openings $32_1$–$32_{10}$ associated with the blade $22_i$ when the end portion 38 is secured to the hub 20. The constraint element 44 can be a U-shaped constraint element that wraps partly around the end portion 38 of the blade $22_i$ so as to contact the end portion 38 along approximately 50% or any other conceivable fraction of the perimeter of the end portion 38. While the constraint against undesired variations of the blade pitch angle θ of the blade $22_i$ may be less effective than that achieved in the example of implementation depicted in FIGS. 2A to 2F, the constraint element 44 engaging the end portion 38 without a groove 40 of the blade $22_i$ may still be deemed to satisfactorily at least partly inhibit a variation of the blade pitch angle θ of the blade $22_i$.

With renewed reference to FIGS. 2A to 2F, it will thus be appreciated that the rotor 12 is configured to facilitate coupling and uncoupling of the blades $22_1$–$22_{10}$ to and from the hub 20; to facilitate setting and adjustment of the blade pitch angle θ of the blades $22_1$–$22_{10}$ to a given value; and to at least partly inhibit undesired variations of the value of the blade pitch angle θ of the blades $22_1$–$22_{10}$.

Specifically, a given blade $22_i$ of the blades $22_1$–$22_{10}$ is coupled to the hub 20 by screwing its internally threaded part 42 relative to the externally threaded part 30 of a given cavity $28_i$ of the cavities $28_1$–$28_{10}$. Once the blade $22_i$ is secured to the hub 20, the blade pitch angle θ of the blade $22_i$ is set to a desired value by a slight screwing or unscrewing action until the desired value is obtained. That is, the end portion 38 of the blade $22_i$ is rotated in the cavity $28_i$ by an angle, such as 5°, 10°, 20° or any other angle, so as to set the blade pitch angle θ of the blade $22_i$ to the desired value.

Once the blade pitch angle θ of the blade $22_i$ is set to the desired value, a constraint element 44 is inserted in the opening $32_i$ of the openings $32_1$–$32_{10}$ associated with the blade $22_i$ so as to provide a constraint against undesired variations in the blade pitch angle θ of the blade $22_i$ from its set value. In the example shown, the U-shaped constraint element 44 is inserted via the second section $45_2$ of the opening $32_i$, is received in the groove 40 of the blade $22_i$, passes through the first section $45_1$ of the opening $32_i$, and emerges at the first side surface $26_1$ of the hub 20, where a pair of nuts 47 is used to secure the constraint element 44 in position and cause the constraint element 44 to engage the groove 40. With the constraint element 44 in position, undesired unscrewing or screwing of the threaded part 42 of the blade $22_i$ relative to the threaded part 30 of the cavity $28_i$ is at least partly inhibited since the constraint element 44 provides a constraint against radial movement of the blade $22_i$ relative to the hub 20. As a result, the constraint element 44 at least partly inhibits undesired variations of the blade pitch angle θ of the blade $22_i$ from its set value which may otherwise occur due to, for example, vibrations experienced by the rotor 12 in rotation during operation of the axial-flow fan 10 (FIG. 1) over an extended period of time.

Furthermore, when the rotor 12 is disposed within the housing 14 (FIG. 1) and coupled to the motor of the axial-flow fan 10 (FIG. 1), it is possible to adjust the blade pitch angle θ of the blade $22_i$ to a desired adjusted value while leaving the rotor 12 coupled to the motor and within the housing 14. More particularly, the nuts 47 are loosened such as to release at least partly the constraining force applied to the end portion 38 of the blade $22_i$ by the constraint element 44. The end portion 38 of the blade $22_i$ can then be rotated in the cavity $28_i$ by an angle, such as 5°, 10°, 20° or any other angle, so as to set the blade pitch angle θ of the blade $22_i$ to the desired adjusted value. Once the blade pitch angle θ of the blade $22_i$ is set to the desired adjusted value, the nuts 47 are tightened such that the constraint element 44 engages the groove 40 to once again provide a constraint against undesired variations of the blade pitch angle θ of the blade $22_i$ from its set adjusted value. Advantageously, such an adjustment of the blade pitch angle θ of the blade $22_i$ without having to remove the rotor 12 from the housing 14 (FIG. 1) and without having to uncouple the rotor 12 from the motor of the axial-flow fan 10 (FIG. 1) improves the performance of the axial-flow fan 10 since significantly less time and effort are required to perform the adjustment compared to that required by other existing rotors.

Although various embodiments have been illustrated, this was for the purpose of describing, but not limiting, the invention. Various modifications will become apparent to those skilled in the art and are within the scope of the present invention, which is defined more particularly by the attached claims.

The invention claimed is:

1. A rotor for a turbomachine, said rotor comprising:
   a hub including a peripheral surface, a first side surface, and a second side surface, said hub defining a plurality of cavities, each one of said cavities extending inwardly from said peripheral surface, said hub defining a plurality of openings, each one of said openings extending from a corresponding one of said cavities to at least one of said first side surface and said second side surface; and
   a blade coupled to said hub, said blade including an end portion fitting in a particular one of said cavities and screwably secured to said hub, a particular one of said openings extending from said particular one of said cavities being adapted to receive a constraint element engaging said end portion, said particular one of said openings extending between said first side surface and said second side surface, said particular one of said openings having a first section and a second section, said second section extending between said second side surface and said particular one of said cavities, said first section being aligned with said second section and extending to said first side surface.

2. A rotor as defined in claim 1, wherein said second section is a slot having a width and said first section is a pair of holes defining therebetween a distance substantially corresponding to said width of said slot.

3. A rotor as defined in claim 1, wherein said hub is a single-piece hub.

4. An axial-flow fan comprising a rotor as defined in claim 1.

5. A rotor as defined in claim 1, wherein said particular one of said cavities has an externally threaded part located therein and said end portion of said blade has an internally threaded part complementary to said externally threaded part, said end portion being screwably secured to said hub via said externally threaded part and said internally threaded part.

6. A rotor as defined in claim 5, wherein said externally threaded part is integral with said hub.

7. A rotor as defined in claim 1, wherein said particular one of said cavities has an internally threaded part located therein and said end portion of said blade has an externally threaded part complementary to said internally threaded part, said end portion being screwably secured to said hub via said externally threaded part and said internally threaded part.

8. A rotor as defined in claim 7, wherein said externally threaded part is integral with said end portion of said blade.

9. A rotor as defined in claim 1, wherein said hub defines a hole extending inwardly from a bottom surface of said particular one of said cavities and said end portion of said blade has an internally threaded part, said end portion being screwably secured to said hub via said internally threaded part and an externally threaded element positioned in said hole.

10. A rotor as defined in claim 1, wherein said end portion of said blade has a perimeter, said particular one of said openings being adapted to receive a constraint element engaging said end portion comprising said particular one of said openings being adapted to receive a constraint element engaging said end portion along about 50% of said perimeter.

11. A rotor as defined in claim 1, wherein said end portion of said blade has a perimeter, said particular one of said openings being adapted to receive a constraint element engaging said end portion comprising said particular one of said openings being adapted to receive a constraint element engaging said end portion at at least three points of said perimeter, said at least three points being non-collinear.

12. A rotor as defined in claim 1, wherein said end portion of said blade has a perimeter, said particular one of said openings being adapted to receive a constraint element engaging said end portion comprising said particular one of said openings being adapted to receive a constraint element engaging said end portion at two segments of said perimeter, said two segments being non-contiguous.

13. A rotor for a turbomachine, said rotor comprising:
a hub including a peripheral surface, a first side surface, and a second side surface, said hub defining a plurality of cavities, each one of said cavities extending inwardly from said peripheral surface, said hub defining a plurality of openings, each one of said openings extending from a corresponding one of said cavities to at least one of said first side surface and said second side surface; and
a blade coupled to said hub, said blade including an end portion fitting in a particular one of said cavities and screwably secured to said hub, a particular one of said openings extending from said particular one of said cavities being adapted to receive a U-shaped constraint element engaging said end portion.

14. A rotor as defined in claim 13, further comprising a U-shaped constraint element received in said particular one of said openings and engaging said end portion.

15. An axial-flow fan comprising a rotor as defined in claim 14.

16. A rotor as defined in claim 13, wherein said end portion of said blade includes a groove, said groove being adapted to receive the U-shaped constraint element, the U-shaped constraint element engaging said end portion comprising the U-shaped constraint element engaging said groove.

17. A rotor as defined in claim 16, wherein said particular one of said cavities has an internally threaded part located therein and said end portion of said blade has an externally threaded part complementary to said internally threaded part, said end portion being screwably secured to said hub via said externally threaded part and said internally threaded part.

18. A rotor as defined in claim 17, wherein said externally threaded part is integral with said end portion of said blade.

19. A rotor as defined in claim 16, wherein said end portion of said blade has a perimeter at said groove, said particular one of said openings being adapted to receive a U-shaped constraint element engaging said end portion comprising said particular one of said openings being adapted to receive a U-shaped constraint element engaging said groove at at least three points of said perimeter at said groove, said at least three points being non-collinear.

20. A rotor as defined in claim 16, wherein said end portion of said blade has a perimeter at said groove, said particular one of said openings being adapted to receive a U-shaped constraint element engaging said end portion comprising said particular one of said openings being adapted to receive a U-shaped constraint element engaging said groove at two segments of said perimeter at said groove, said two segments being non-contiguous.

21. An axial-flow fan comprising a rotor as defined in claim 16.

22. A rotor as defined in claim 16, wherein said particular one of said cavities has an externally threaded part located therein and said end portion of said blade has an internally threaded part complementary to said externally threaded part, said end portion being screwably secured to said hub via said externally threaded part and said internally threaded part.

23. A rotor as defined in claim 22, wherein said externally threaded part is integral with said hub.

24. A rotor as defined in claim 16, wherein said hub defines a hole extending inwardly from a bottom surface of said particular one of said cavities and said end portion of said blade has an internally threaded part, said end portion being screwably secured to said hub via said internally threaded part and an externally threaded element positioned in said hole.

25. A rotor as defined in claim 16, wherein said end portion of said blade has a perimeter at said groove, said particular one of said openings being adapted to receive a U-shaped constraint element engaging said end portion comprising said particular one of said openings being adapted to receive a U-shaped constraint element engaging said groove along about 50% of said perimeter at said groove.

26. A rotor as defined in claim 13, wherein said particular one of said openings extends between said first side surface and said second side surface, said particular one of said openings having a first section and a second section, said second section extending between said second side surface and said particular one of said cavities, said first section being aligned with said second section and extending to said first side surface.

27. A rotor as defined in claim 26, wherein said second section is a slot having a width and said first section is a pair of holes defining therebetween a distance substantially corresponding to said width of said slot.

28. A rotor as defined in claim 13, wherein said hub is a single-piece hub.

29. A rotor as defined in claim 16, wherein said groove extends circumferentially along a perimeter of said end portion.

30. An axial-flow fan comprising a rotor as defined in claim 13.

31. A rotor as defined in claim 13, wherein said particular one of said cavities has an externally threaded part located therein and said end portion of said blade has an internally threaded part complementary to said externally threaded part, said end portion being screwably secured to said hub via said externally threaded part and said internally threaded part.

32. A rotor as defined in claim 31, wherein said externally threaded part is integral with said hub.

33. A rotor as defined in claim 13, wherein said particular one of said cavities has an internally threaded part located therein and said end portion of said blade has an externally threaded part complementary to said internally threaded part, said end portion being screwably secured to said hub via said externally threaded part and said internally threaded part.

34. A rotor as defined in claim 33, wherein said externally threaded part is integral with said end portion of said blade.

35. A rotor as defined in claim 13, wherein said hub defines a hole extending inwardly from a bottom surface of said particular one of said cavities and said end portion of said blade has an internally threaded part, said end portion being screwably secured to said hub via said internally threaded part and an externally threaded element positioned in said hole.

36. A rotor as defined in claim 13, wherein said end portion of said blade has a perimeter, said particular one of said openings being adapted to receive a U-shaped constraint element engaging said end portion comprising said particular one of said openings being adapted to receive a U-shaped constraint element engaging said end portion along about 50% of said perimeter.

37. A rotor as defined in claim 13, wherein said end portion of said blade has a perimeter, said particular one of said openings being adapted to receive a U-shaped constraint element engaging said end portion comprising said particular one of said openings being adapted to receive a U-shaped constraint element engaging said end portion at at least three points of said perimeter, said at least three points being non-collinear.

38. A rotor as defined in claim 13, wherein said end portion of said blade has a perimeter, said particular one of said openings being adapted to receive a U-shaped constraint element engaging said end portion comprising said particular one of said openings being adapted to receive a U-shaped constraint element engaging said end portion at two segments of said perimeter, said two segments being non-contiguous.

39. A rotor for a turbomachine, said rotor comprising:
a hub including a peripheral surface, a first side surface, and a second side surface, said hub defining a plurality of cavities, each one of said cavities extending inwardly from said peripheral surface, said hub defining a plurality of openings, each one of said openings extending from a corresponding one of said cavities to at least one of said first side surface and said second side surface; and
a plurality of blades coupled to said hub, each one of said blades including an end portion, wherein, for each particular blade of said blades:
said end portion fits in a respective one of said cavities and is screwably secured to said hub, a respective one of said openings extending from said respective one of said cavities being adapted to receive a U-shaped constraint element engaging said end portion.

40. A rotor as defined in claim 39, further comprising, for each particular blade of said blades, a respective U-shaped constraint element received in said respective one of said openings and engaging said end portion.

41. An axial-flow fan comprising a rotor as defined in claim 40.

42. A rotor as defined in claim 39, wherein said end portion of each one of said blades includes a groove, for each particular blade of said blades, said groove being adapted to receive the U-shaped constraint element, the U-shaped constraint element engaging said end portion comprising the U-shaped constraint element engaging said groove.

43. A rotor as defined in claim 42, further comprising, for each particular blade of said blades, a respective U-shaped constraint element received in said respective one of said openings and said groove and engaging said groove.

44. An axial-flow fan comprising a rotor as defined in claim 43.

45. An axial-flow fan comprising a rotor as defined in claim 42.

46. An axial-flow fan comprising a rotor as defined in claim 39.

47. A rotor for a turbomachine, said rotor comprising:
a hub including a peripheral surface, a first side surface, and a second side surface, said hub defining a plurality of cavities, each one of said cavities extending inwardly from said peripheral surface, said hub defining a plurality of openings, each one of said openings extending from a corresponding one of said cavities to at least one of said first side surface and said second side surface; and
a plurality of blades coupled to said hub, each one of said blades including an end portion, wherein, for each particular blade of said blades:
said end portion fits in a respective one of said cavities and is screwably secured to said hub, a respective one of said openings extending from said respective one of said cavities being adapted to receive a constraint element engaging said end portion, said particular one of said openings extending between said first side surface and said second side surface, said particular one of said openings having a first section and a second section, said second section extending between said second side surface and said particular one of said cavities, said first section being aligned with said second section and extending to said first side surface.

* * * * *